United States Patent
Tsui et al.

(10) Patent No.: US 7,206,770 B2
(45) Date of Patent: Apr. 17, 2007

(54) APPARATUS FOR GENERATING SEQUENCES OF ELEMENTS

(75) Inventors: Kwok C Tsui, Kowloon (CN); Behnam Azvine, Ipswich (GB); David P Djian, Alpes Martimes (GB); Nader Azarmi, Colchester (GB); Neill R Taylor, London (GB); John G Taylor, London (GB)

(73) Assignee: Bristish Telecommunications plc, London (GB)

( * ) Notice: Subject to any disclaimer, the term of this patent is extended or adjusted under 35 U.S.C. 154(b) by 499 days.

(21) Appl. No.: 10/311,239

(22) PCT Filed: Jun. 28, 2001

(86) PCT No.: PCT/GB01/02903

§ 371 (c)(1),
(2), (4) Date: Dec. 17, 2002

(87) PCT Pub. No.: WO02/03324

PCT Pub. Date: Jan. 10, 2002

(65) Prior Publication Data

US 2003/0105597 A1    Jun. 5, 2003

(30) Foreign Application Priority Data

Jun. 30, 2000    (EP) .................................. 00305512

(51) Int. Cl.
*G06F 7/00*    (2006.01)
(52) U.S. Cl. .............................. 706/15; 706/20; 706/25
(58) Field of Classification Search ................. 712/3; 706/6, 10, 12, 14–16, 18, 20, 25, 31, 37, 706/39, 45, 46, 48, 50, 54, 55, 59, 61, 902
See application file for complete search history.

(56) References Cited

U.S. PATENT DOCUMENTS 4,914,603 A * 4/1990 Wood .......................... 706/25
5,434,783 A    7/1995 Pal et al.

(Continued)

FOREIGN PATENT DOCUMENTS

EP    99309017.4    11/1999

(Continued)

OTHER PUBLICATIONS

Sheng et al., "Temporal Associative Memory With Finite Internal States," IEEE, NY (Jun. 27, 1994), pp. 1109-1114, XP000532179.

(Continued)

*Primary Examiner*—Joseph P Hirl
*Assistant Examiner*—Omar F. Fernández Rivas
(74) *Attorney, Agent, or Firm*—Nixon & Vanderhye P.C.

(57) ABSTRACT

An apparatus and operating method for generating a second one or more sequences of elements after receiving a first one or more sequence of elements. The apparatus includes an identifying device that receives a first one or more sequence of elements, accesses stored sequences, and identifies which of the stored sequences each of the first one or more received sequences of elements most closely resembles. The identifying device is operable to output for each received sequence of elements, an identifying signal indicative of the correspondingly identified stored sequence. The apparatus further includes a sequence generator that generates sequences of elements, operates to receive an input, an identifying signal, and generates a sequence of elements in response thereto.

14 Claims, 11 Drawing Sheets

U.S. PATENT DOCUMENTS

| | | | | |
|---|---|---|---|---|
| 6,018,727 A | * | 1/2000 | Thaler | 706/16 |
| 6,601,049 B1 | * | 7/2003 | Cooper | 706/15 |
| 2001/0011259 A1 | * | 8/2001 | Howard | 706/25 |

OTHER PUBLICATIONS

International Preliminary Examination Report, PCT/GB01/02903, dated Apr. 3, 2002.

Wang et al., "A Connectionist Model for Dialog Processing," IEEE NY, ICASSP 91, vol. 2 (May 14-17, 1991), pp. 785-788, XP000222246.

Park et al., "A Hierarchical Neural Network Approach to Intelligent Traffic Control," IEEE NY (Jun. 27, 1994), pp. 3358-3362, XP000532726.

Amit et al., "Architecture of Attractor Neural Networks Performing Cognitive Fast Scanning," Network: Computation in Neural Systems, GB, IOP Publishing, Bristol, vol. 1, No. 2 (Apr. 1, 1990), pp. 189-216, XP000134773.

Trippi et al., "Neural Networks in Finance and Investing," Probus Publishing (1993), pp.

Haykin, S., "Neural Networks: A Comprehensive Foundation," NY: Macmillan (1994), p. 2.

* cited by examiner

Input vectors to 304c:

email, team meeting, appraisal email, appraisal, team meeting, appraisal, email, team meeting appraisal, team meeting, email team meeting, email, appraisal team meeting, appraisal, email,

APPARATUS FOR GENERATING SEQUENCES OF ELEMENTS

This application is the US national phase of international application PCT/GB01/02903 filed 28 Jun. 2001 which designated the U.S.

FIELD OF THE INVENTION

The present invention relates to apparatus for generating sequences of elements, and is suitable particularly but not exclusively for generating sequences of elements, such as numbers or task names.

BACKGROUND OF THE INVENTION

Machine learning systems are, among other things, applied as a mechanism for learning information that can then be applied to efficiently automate and control various processes. Neural network systems, in particular, provide a means of extrapolating from learnt information in order to provide a solution to problems that are inherently insolvable by rule-based systems. Neural networks have wide applicability, in areas such as financial engineering, providing, for example, equity predictions, market forecasting, bond rate prediction and corporate mergers predictions (Trippi, R., and E. Turban, (eds) Neural Networks in Finance and Investing, Irwin/Probus Publishing, 1993). Other uses for machine learning techniques include data classification, which can be applied to design a fault detection system (e.g. for pipes), or an automatic grading system (e.g. for produce such as apples). Yet further uses include robotic systems, which may be described as complex dynamical systems having many degrees of freedom, and are operable to perform series of movements, actions or processes. In the latter application, controlling parameters may be learnt and applied in order to achieve an appropriate scheduling of actions.

Neural networks are networks of many simple processors ("nodes"). The nodes are connected by communication channels ("links"), which usually carry numeric data, encoded by any of various means. The nodes operate only on their local data and on the inputs they receive via the links. Most neural networks have some sort of "training" rule whereby the weights of links are adjusted on the basis of data, thus neural networks "learn" from examples (as children learn to recognize dogs from examples of dogs) and exhibit some capability for generalisation beyond the training data. According to Haykin, S. (1994), Neural Networks: A Comprehensive Foundation, NY: Macmillan, p. 2:

"A neural network is a massively parallel distributed processor that has a natural propensity for storing experiential knowledge and making it available for use. It resembles the brain in two respects:

1. Knowledge is acquired by the network through a learning process,
2. Inter-neuron connection strengths, known as synaptic weights, are used to store the knowledge."

Neural network systems that are used for learning sequences to create planning solutions and schedule systems, or user tasks, embed a process known as Temporal Sequence Storage and Generation (TSSG) into the system Do create a schedule of tasks. TSSG is based on observations of sequence retention by biological systems. There is a certain class of neural networks that is ideally suited to model TSSG, as they can be trained using inductive learning algorithms. Current neural networks that achieve TSSG include time-delay nets[i], which implement Hakens embedding theorem, and various recurrent models, such as the spin-glass[ii]; nets with context neurones[iii]; the Elman net[iv] and extensions thereof[v]; and the crumbling history approach[vi]. However, the spin-glass is limited to reproducing, short sequences, the Elman net uses associative chaining to generate sequences, which is computationally expensive, and the crumbling history approach cannot plan successfully using learnt sequences. In all of these cases, the ability of the neural networks to be integrated usefully into systems that perform complex scheduling tasks such as work pattern management is limited.

Applicant's co-pending European Application 99309017.4 (IPD case ref A25829) describes a neural network system, which is concerned with generating unlimited sequences of elements (which may be user tasks and subtasks) and makes use of multiple ACTION networks configured in a hierarchical arrangement. Each of the ACTION networks has been trained to output four elements, and once an ACTION network has been trained, it can be inserted into the hierarchy as a black box, or "off-the-shelf" item. Such a tool may be applied to schedule user tasks to be performed in, say, a morning: the tasks will be input to the system, and the system will return a task order that best represents the user's observed preferred ordering of tasks.

Journal publication "Temporal associative memory with finite internal states", Chengke Sheng and Yu-Cheng Liu, IEEE, New York, 27 Jun. 1994 pp. 1109–1114 discloses a Finite State Network (FSN), which associates a temporal input pattern with a temporal output pattern. The FSN comprises three layers: an input layer, an output layer and a state layer, the layers being arranged such that for each State ($S_i$) there is a corresponding element ($L_i$) of the temporal input pattern and element ($D_i$) of the output pattern associated therewith. Essentially a trained FSN can be represented as a tree, each level representing a different state ($S_i$) and a different element in the temporal pattern, so that the number of levels in the tree is dependent on the number of elements in the input pattern. The paper describes a particular example where the FSN is trained on string pairs (input: OOD, output: OPQ). The trained FSN comprises a tree having three levels, where at least one of the paths therein follows [input/output] O/O; O/P; D/Q, so that for each element of the temporal input sequence an output element is generated. Once the FSN has traced a path through the tree, the outputs are collated together to produce the output string OPQ.

SUMMARY OF THE INVENTION

According to a first aspect of the invention, there is provided neural network apparatus comprising
  identifying means for receiving a first one or more sequence of elements,
  accessing stored sequences, and
  identifying which of the stored sequences each of the first one or more received sequences of elements most closely resembles,
  where the identifying means is operable to output, for each received sequence of elements, an identifying signal indicative of the correspondingly so identified stored sequence. The apparatus further comprises
  a sequence generator for generating sequences of elements, operable to receive as input a said identifying signal and to generate a sequence of elements in response thereto.

The apparatus is adapted to operate such that when a first sequence of elements is input to the identifying means (i), the identifying means identifies a stored sequence that the first sequence of elements most closely represents and outputs to the sequence generator an identifying signal indicative of the same, and the sequence generator (ii) generates a second one or more sequences in response thereto.

Preferably the identifying means (i) comprises a plurality of classifying units, each of which classifying units comprises a plurality of first classifying nodes; a plurality of second classifying nodes, and a plurality of classifying links. Each of the classifying links connects one of the first classifying nodes with one second classifying node and has a classifying weight associated with it. Each of the classifying units is operable to learn one or more sequences of elements by modifying the classifying weights on the classifying links.

Preferably the sequence generator for generating sequences of elements (ii) includes one or more task units, each task unit comprising an upper and a lower neural network connected in a hierarchical relationship and being connected to each of the other task units by means of sequence generator weighted connections therebetween.

According to a further aspect of the present invention, there is provided a method of training an apparatus to generate a predetermined second one or more sequences of elements after receiving a predetermined first one or more sequences of elements. The method comprises the steps:

inputting a plurality of first training sequences to identifying means for learning and classification thereby;

inputting a plurality of second training sequences to a sequence generator for generating sequences of elements, for storage therein;

for each of the second training sequences, training the sequence generator for generating sequences of elements to re-generate the sequence in accordance with a predetermined order;

interconnecting the identifying means with the sequence generator of steps (ii) and (iii) by connecting means, which connecting means comprises one or more variably weighted links.

Then, for each of the plurality of predetermined first sequences, the identifying means is operated in association with the sequence generator for generating sequences by means of the connecting means, such that the sequence generator reproduces the predetermined second sequence associated with the respective first sequence.

According to yet a further aspect of the present invention, there is provided a method of generating a second one or more sequences of elements after processing a first one or more sequences of elements. The method comprises the steps of:

inputting a first sequence of elements to identifying means;

accessing stored sequences;

identifying which of the stored sequences each of the first one or more sequences of elements most closely resembles;

operating the identifying means so as to generate an output signal indicative of the correspondingly so identified stored sequences;

connecting said output signal to a sequence generator for generating sequences of elements; and operating the sequence generator for generating sequences of elements.

The method preferably operates such that when a sequence of elements is input to the identifying means (i), the identifying means identifies which of the stored sequences the first sequence of elements most closely represents and outputs a signal indicative of the same. The output signal is thereafter connected to the sequence generator (ii) for generating sequences of elements, and the sequence generator (ii) outputs a signal indicative of a second one or more sequences.

BRIEF DESCRIPTION OF THE DRAWINGS

Further aspects, features and advantages of the apparatus for generating sequences of elements will now be described, by way of example only as an embodiment of the present invention, and with reference to the accompanying drawings, in which:

FIG. 8b is a schematic representation of layers of a Kohonen Self-Organising Map unit (SOM) comprising part of the identifying means shown in FIG. 8a;

FIG. 8c is a list of permutations of elements that comprise an input training set to the SOM of FIG. 8b;

DETAILED DESCRIPTION OF THE INVENTION

In the following description, the terms "layer", "node", "activity", "weight", "inhibitory weight", "excitatory weight" and "weight initialisation" are used. These are defined as follows:

A "layer": a data store such as an array, or a matrix, of elements, which elements are the nodes described below;

A "node": an array element which receives inputs from, and provides outputs to, other array elements within the same layer or elements within different layers;

"Activity": values in the array elements computed from input functions from and output functions to connected layers;

"Weight": a multiplier which is applied to the input and output functions, and which controls the amount of activity input to or output from each node;

"Inhibitory weight": a multiplier having a value less than 0;

"Excitatory weight": a multiplier having a value greater than 0;

"Weight initialisation": the sequences generated by the present invention are controlled by the configuration of the layers, the functions between connected layers, and the weights. The means of generating a sequence of elements includes a computational process, and the various parameters in the controlling equations require suitable initialising. Thus weight initialisation refers to the initial configuration of the weights;

"Task": a category of work, such as email, report, meeting etc.

"Sub-task": components-that comprise a task, so for a task of email, a sub-task may be open email, read email, reply to email, archive email etc.

General Overview of Operational Layer

Figure 1:
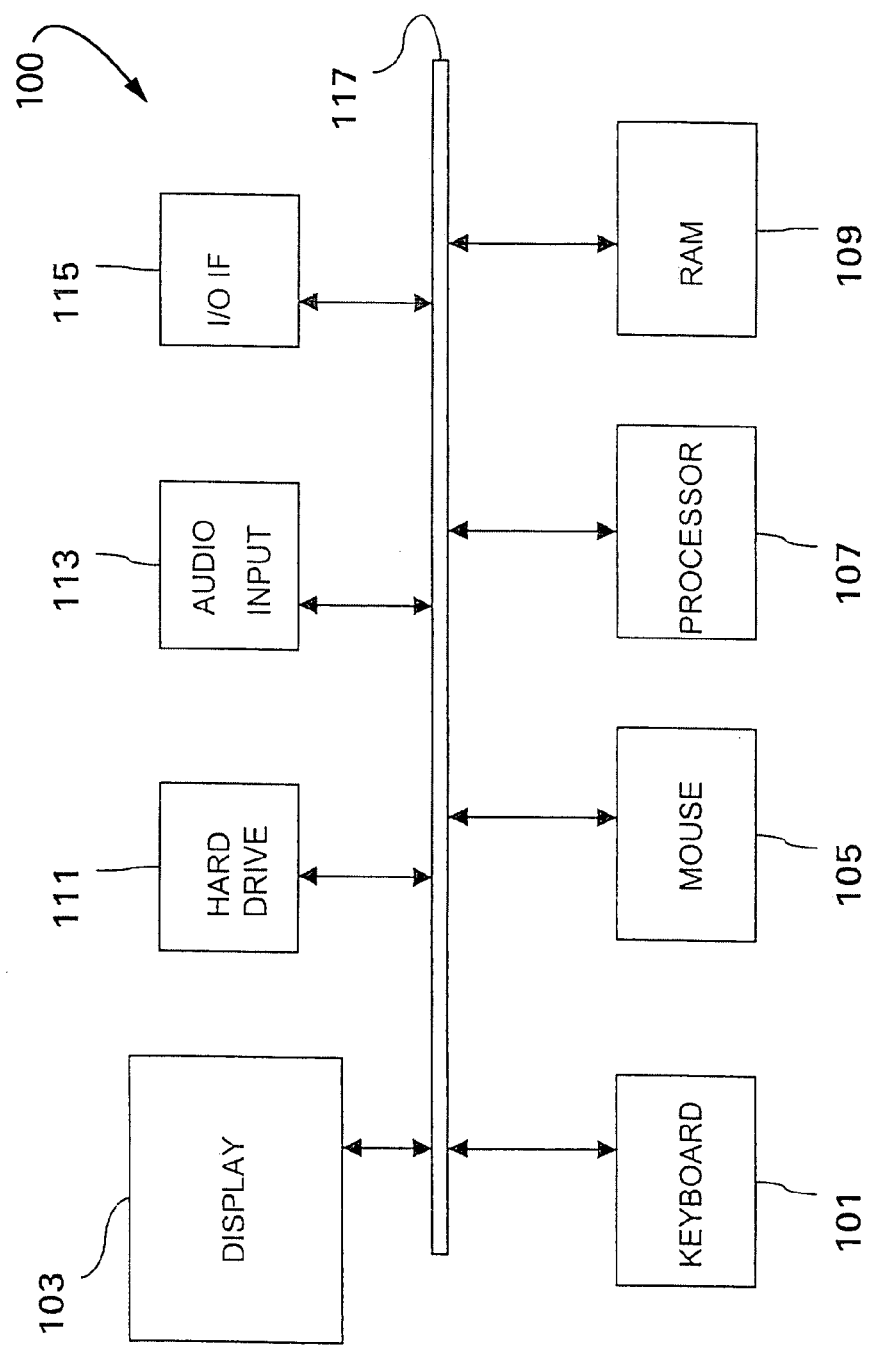
FIG. 1 is a schematic block diagram of the hardware of a computer system configured to run a sequence generator of the present invention.

Referring to FIG. 1, an environment for effecting the present invention comprises a generally conventional computer system 100 that comprises: a conventional keyboard 101; a display screen 103, such as a CRT or plasma screen; a mouse 105; a processor 107 such as a Pentium™ processor; random access memory 109; a hard disc drive 111; an audio input 113 such as a microphone to detect utterances from the user; and input/output interfaces 115 to connect the workstation to a local area network (LAN), wider area networks (WAN) and/or the internet, to facilitate data exchange including e-mail messaging with remote users connected to such networks. The interface 115 also allows control of a plain old telephone set (POTS) and the components shown in FIG. 1 are interconnected by a common bus 117. In addition to the single system configuration shown in FIG. 1, several computer systems (not shown) may be interconnected over a local area network via the input/output interface 115.

Figure 2:
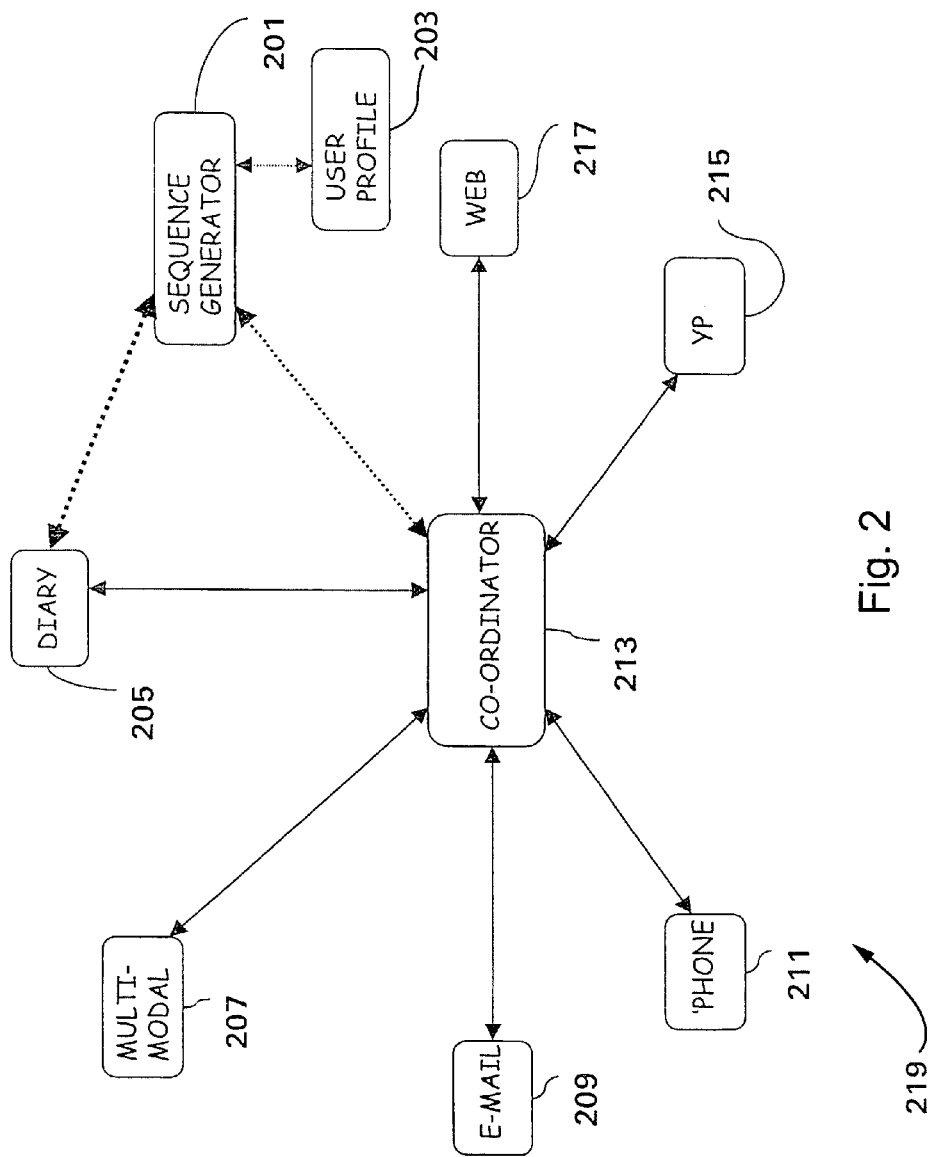
FIG. 2 is a schematic diagram showing the sequence generator interacting with a plurality of intelligent agents according to the present invention.

Referring also to FIG. 2, apparatus 201 for generating sequences of elements to be executed by a computer system, referred to generally as a sequence generator, may be stored on the hard disc drive 111 for processing by the processor 107. In the embodiment described herein, the sequence generator 201 may be part of an intelligent assistant (IA) system 219, which enables users to devote their time to highly complex tasks while the system 219 takes some decisions on behalf of the user based on previous observations of the user or stored user preferences. It does this by generating a sequence of elements, which are tasks to be carried out by the IA system 219 for the user. Typical tasks to be performed by the system include time, information and communication management. When the computer system comprises several computer workstations, several intelligent assistant systems 219 may be active and may communicate with one another.

As shown in FIG. 2, such an IA system 219 may additionally comprise a set of autonomous systems 205, 207, 209, 211, 213, 215, 217 generally referred to as agents, specialising in various tasks such as diary management, telephone call filtering and e-mail prioritisation, web search, telephone directory enquiry, multi-modal interface and communication flow management. Each agent has its own interface and interacts with the user in its own particular way, and the agents communicate with one another by message passing. These agents comprise reactive, collaborative, deliberative and proactive agents that respond to events in the user's environment (such as e-mails and telephone calls) by initiating interactions with the user. The sequence generator 201 may interact with the diary assistant 205, organising a pool of tasks, which may be a user's tasks for a day, and generating a sequence order for the tasks based on knowledge of the user's preferred work patterns and of what tasks the user has recently completed. This information may be available as a user profile 203, and may additionally include information relating to preferences as a function of time of day and availability of the user with inputs from the agents comprising the intelligent assistant system 219. The sequence generator 201, when integrated into the intelligent assistant system 219, may also and/or alternatively be used to organise inter-agent tasks such that if 201 dynamically directs a preferred order of agent tasks based on learnt agent capabilities. Thus the elements sequenced by the sequence generator 201 may include work tasks and sub-tasks for a range of entities, such as a user, a piece of equipment or a business. In the following description, work tasks and sub-tasks of a user are described as examples of elements that comprise sequences generated by embodiments of the present invention.

A sequence generator 201, according to an embodiment of the present invention, provides infrastructure management of tasks to be performed by an entity, based on learnt context-based task ordering. Within the framework of the present invention, context-based means taking account of the tasks that were carried out before the tasks that comprise the current plan as well as taking account of current inter-task preferences. When the tasks are machine-processable events, such as kernel events, or inter-agent transfer of information, the order in which a series of tasks comprising, for example, system calls to be processed is likely to depend on which tasks have been completed before. When the tasks are user-based, the selection of tasks to be performed next is similarly likely to be determined, at least in part, by which tasks were performed before. In this latter scenario an embodiment of the present invention is accounting for, among other things, the context of the user after having completed those previous tasks. The sequence generator therefore receives as input the tasks previously completed, and outputs a sequence, in a preferred order, of tasks that would best suit the user's present context. This output is preferably realised by a neural network system that has been trained on previously observed context-based behaviour patterns, as described below.

Embodiment: Sequence Generator for Generating Context-Based Sequences of Elements Overview of Sequence Generator 201

Figure 3:
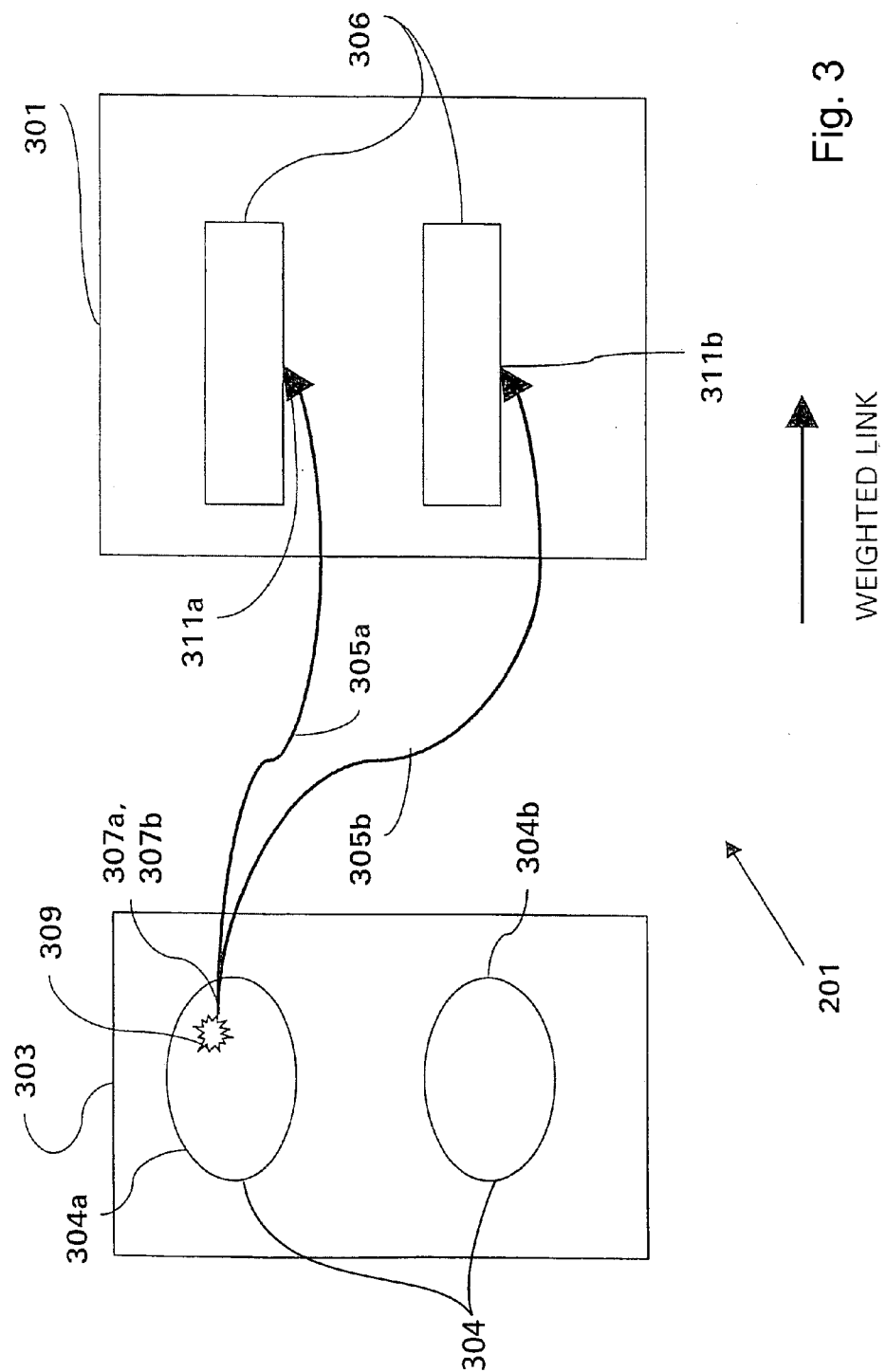
FIG. 3 is a schematic representation of apparatus for generating sequences of elements according to an embodiment of the present invention.

As shown in FIG. 3, the sequence generator 201 for generating context based sequences of elements has two parts, an identifying part 303 and a neural network part 301. The sequence generator 201 may receive, as input, tasks that a user has already completed. The identifying part 303 of the sequence generator 201 matches these input tasks to a known set of tasks. It then outputs a value, which is representative of a best match to that known set of tasks (or a default value if a best match could not be found), to the neural network part 301 and the neural network 301 generates a subsequent task sequence based on the "best match" value that it receives. As described below, the identifying part 303 may comprise a classifier, such as a Self-Organising Map (SOM) system 304, and connecting means 305a, 305b, which are described below, may connect the value output from the SOM system 304 to the neural network part 301.

In use of such a system, the user may for instance carry out some tasks, which the diary assistant 205 monitors. The diary assistant 205 inputs this set of tasks to the SOM system 304, which, having access to stored sequences of previously observed tasks, operates to find a best match between the stored sequences of tasks and the received input sequence of tasks. The SOM system 304 identifies this best match by means of an output signal, and the output signal is transmitted to the neural network system 301. Once the neural network 301 has received an input signal from the SOM system 304, the neural network 301 outputs a sequence of tasks, as described in detail below.

As shown in FIG. 3, the SOM system 304 comprises a plurality of individual self-organising map units 304a, 304b, each of which has access to (different) stored sequences. The best match between the received sequence and stored sequences is therefore identified by one of the self-organising map units 304a, 304b, and the output signal described above is thus a signal emanating from the unit that has identified the best match. This output is then connected to each of the task units 306, which, as shown in FIG. 3 as unit 304a, is via more links 305a, 305b.

The sequence generator 201 provides increased functionality over the neural network system 301 on its own, which only reproduces sequences that it has learnt in isolation, i.e. for an input of, say, 1, the neural network system 301 outputs a pre-learnt sequence of numbers. In contrast, the sequence generator 201 effectively replaces the "1" input with an input that is representative of what has been done before, as provided by output from the SOM system 304. Hence if a user had performed tasks 1 to 3 of a series of tasks, to get a subsequent task sequence from the neural network system 301 on its own, the input to the neural network system 301 would logically be "3" and the system would generate a task sequence that it has previously learned for "3", for instance "4,5,6". For the sequence generator 201 however, the input would be "1,2,3" or perhaps "2,1,3" or there may be an unknown task in the set such as "1,a, 3". The SOM system 304 of the sequence generator 201 may respond differently to each of those inputs and thus produce a different "best match" for each of the sequences. In turn, the neural network system 301 may generate a different subsequent task sequence in response. Hence the sequence generator 201 for generating context-based sequences has a significantly more complex set of behaviours available than a system generating sequences in isolation 301.

In terms of the IA system 219, this represents a more useful tool—the IA system 219 is (partly) concerned with automating processes for a user so that the user can concentrate on "higher level" tasks. So, for example, if the user returns to his office having already completed tasks A, B, C, what will he want to do next? The sequence generator 201 will take input from whichever of the self-organising map units 304a, 304b most closely corresponds to tasks A, B, C and will feed that into the neural network system 301. By comparison, the neural network system 301 alone would generate an order for subsequent tasks based on a preferred order when these tasks are performed in isolation.

The present invention undergoes a training phase before it may be used as a system to output context-based sequences of elements. The following description first discloses an embodiment of the configuration of the sequence generator and then discloses the steps involved in training and operating the sequence generator.

Description of Neural Network System 301

Figure 4:
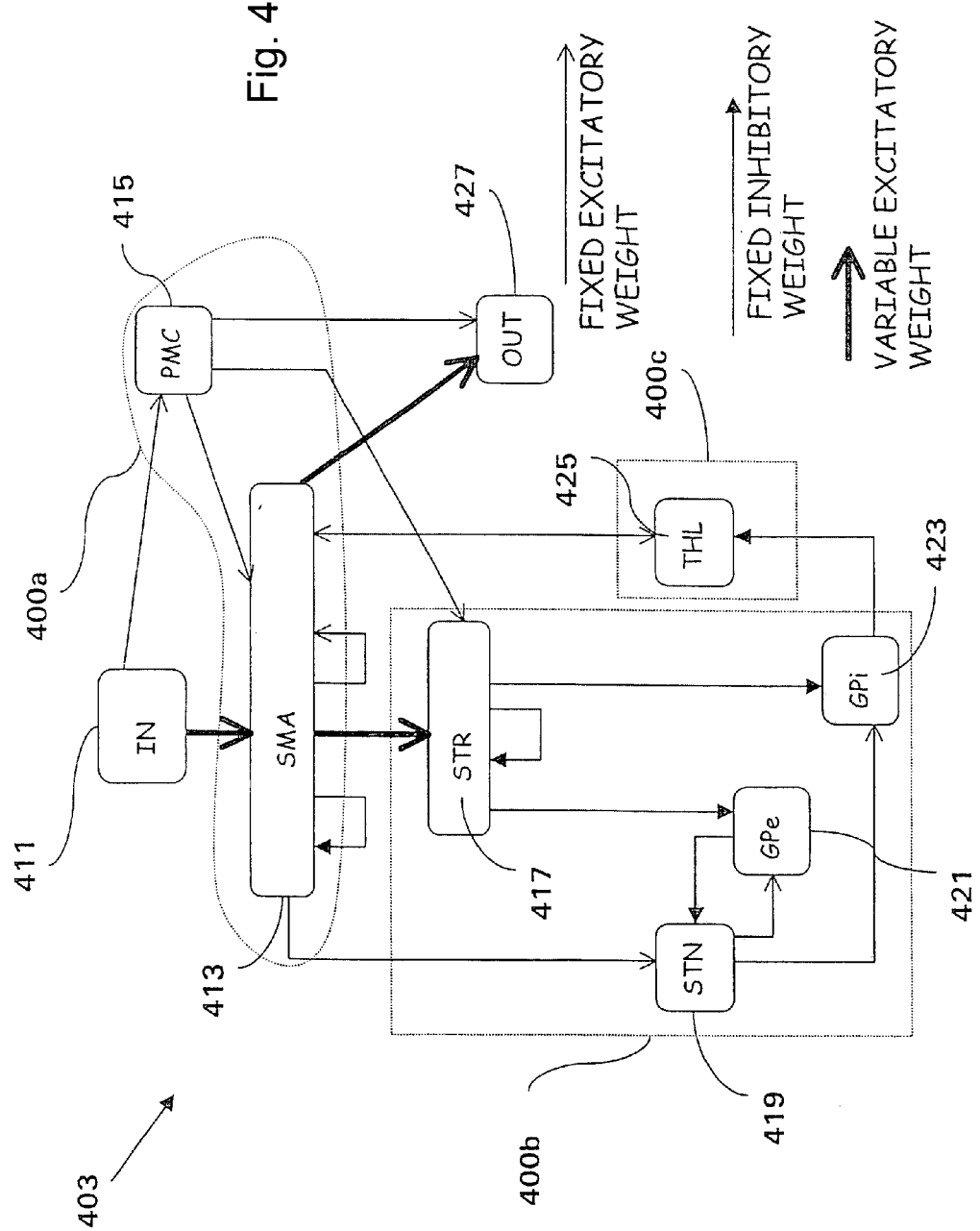
FIG. 4 is a schematic representation of a recurrent neural network known as the ACTION network for use in the apparatus of FIG. 3.

Considering the neural network system 301, as described in Annex 1, it is based on a network known as the ACTION network[vii], shown as a cartoon version of the frontal lobes cortical (cortex) and sub-cortical structures (basal ganglia, cerebellum) in FIG. 4; The ACTION network 403 is a recurrent neural network that undergoes supervised learning, and which comprises a plurality of layers, which are specifically a first layer 400a comprising two cortical regions, the SMA 413 and the PMC 415; a second layer 400b comprising the basal ganglia, composed of the STR 417, the STN 419 and the GPe, GPi 421, 423 (external and internal respectively); and a further layer 400c comprising the THL 425. Each ACTION network 403 is operable to receive an input 411 and produce an output 427.

Figure 5:
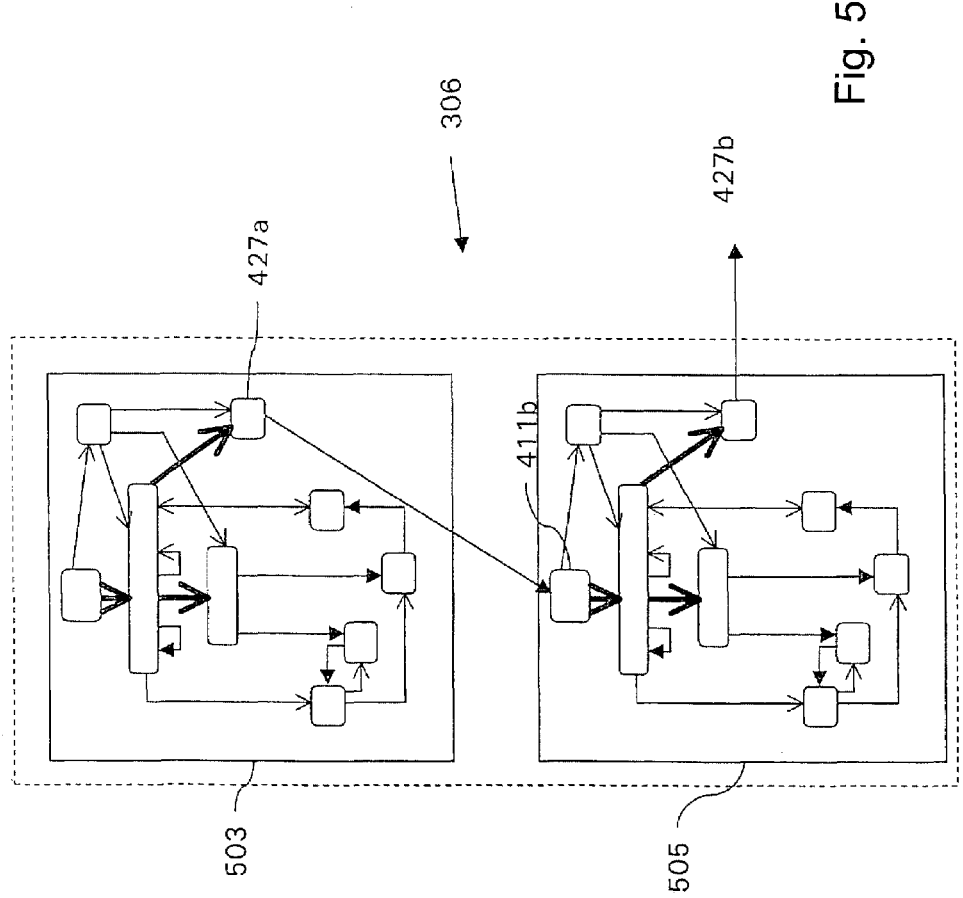
FIG. 5 is a schematic representation of a task unit comprising an upper and a lower ACTION network of FIG. 4 arranged in a hierarchical relationship.

A task unit 306 is shown in FIG. 3, comprising a number of ACTION networks 403 arranged in a hierarchical relationship. FIG. 5 shows a task unit comprising one upper network 503 and one lower network 505, which is the simplest task unit arrangement possible. The output 427a from the upper ACTION network 503 provides the input 411b to the lower ACTION network 505, and this generates output 427b from the task unit 306. Thus the only difference in architecture between the upper and lower ACTION networks is the inclusion of connection 427a from the upper ACTION network 503 to the lower ACTION network 505. As shown in FIG. 3, there may be a plurality of task units, each of which, as reproduced in FIG. 6, may comprise one upper ACTION network 601a, 601b connected to a plurality of lower ACTION networks 603a, 603b, 603c (to give two task units comprising respectively the ACTION networks (a) 601a, 603a, 603b, 603c and (b) 601b, 603a, 603b, 603c). As all of the networks 601, 603 are identical with respect to their components, they are each capable of storing up to four values (which for this particular embodiment are tasks or sub-tasks thereof). There is no limit to the number of levels that may be connected to provide output sequences, and the system may be categorised in terms of numerous upper and lower ACTION network couplings.

Figure 7:
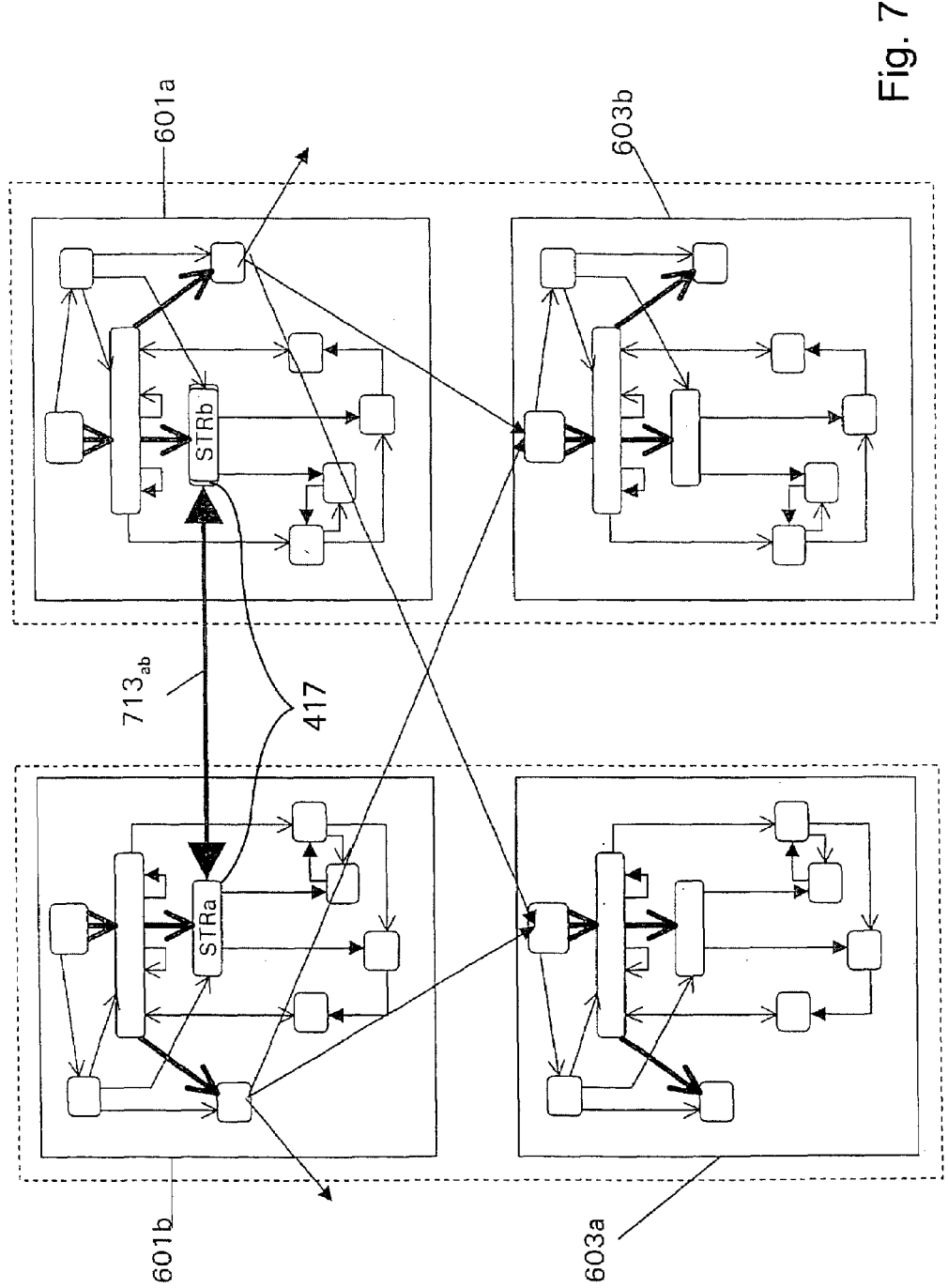
FIG. 7 is a schematic representation of two task units of FIG. 5 interconnected by a variable weight link.

As further discussed in Annex 1, and as is shown in FIG. 7, two or more task units may be connected laterally by means of a connection link 713, which is a variable weight connection, and connects the STR layers 417 between associated upper networks 601a, 601b. FIG. 7 only shows two task units interconnected by link $713_{ab}$; there is a one node-to-all nodes clink for each STR layer of the upper ACTION network of each task unit[viii]. Varying the weight on this link provides a means of simulating competition between the respective task units, and thus respective tasks.

Figure 6:
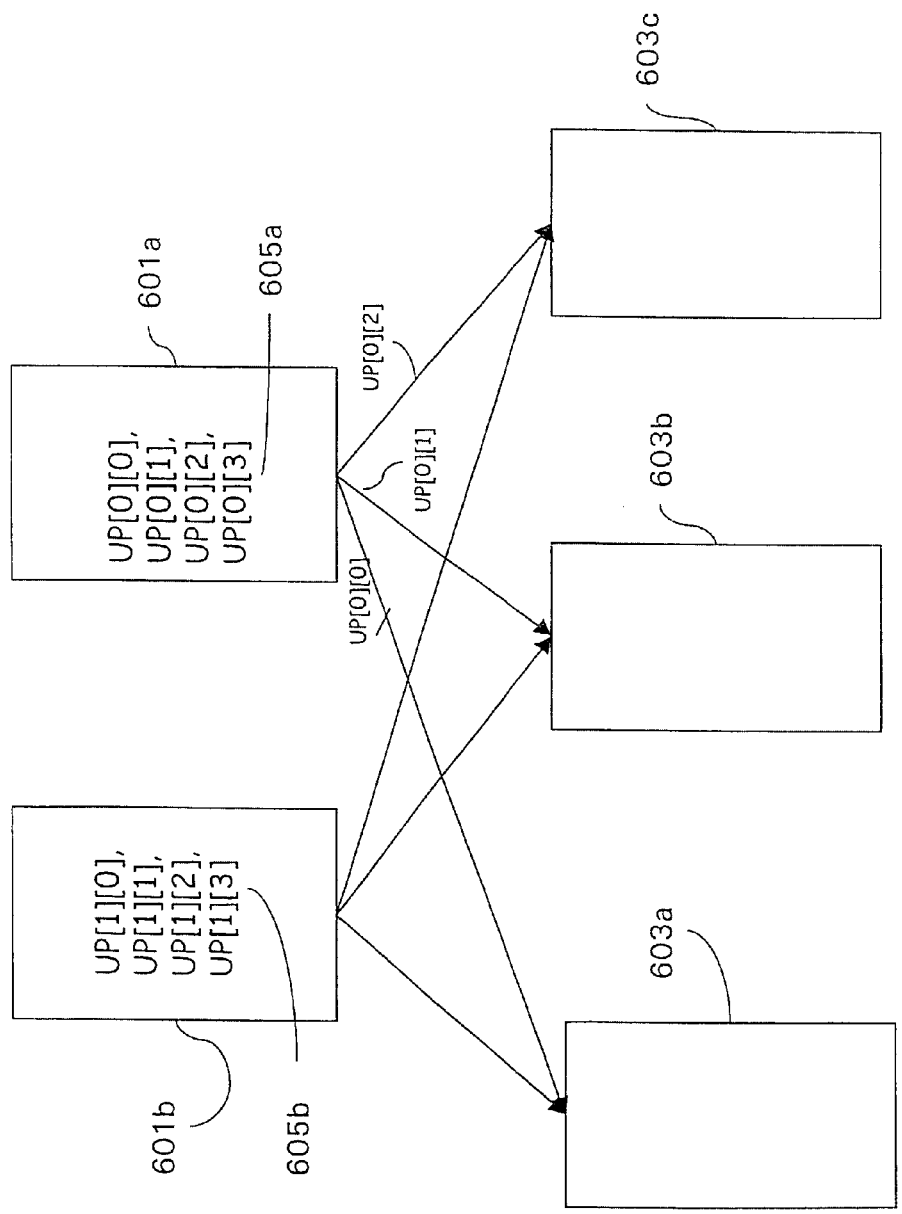
FIG. 6 is a schematic representation of two task units of FIG. 5, each comprising one upper and three lower ACTION networks of FIG. 4 arranged in a hierarchical relationship.

The neural network system 301 of the co-pending application can be trained to reproducibly output a series of elements in a known and desired sequence order. Once trained, the output from each upper ACTION networks 601a, 601b acts as a seeding pattern to the lower ACTION networks 603a, 603b, 603c, and each upper ACTION network 601a, 601b initiates the series of elements in the order specified in its output array 605a, 605b. The whole sequence will be generated in the correct order from a single seed into the upper ACTION network, while the outputs therefrom are hidden and the sequence is controlled by the lower ACTION networks 603a, 603b, 603c. FIG. 6 also shows that the inputs to and outputs from the ACTION networks are numbers, which may be hard-wired or software switched, depending on the system design, to effect tasks or sub-tasks. Each task unit 306 may only output a single task, such that, if one upper neural network is connected to more than one lower neural network, as shown in FIG. 6, each of the outputs of the lower neural networks must be sub-tasks of a single task.

Description of Identifying Means 303

The identifying means 303 comprises means for storing sequences of elements together with information that is used to perform classification of the sequences. The identifying means 303 may be provided by a plurality of Self-organising Map (SOM) units 304a, 304b; a Self-Organising Map is well known to those skilled in the art to be a classifier. A SOM is an unsupervised learning neural network that is modular (in the sense that each SOM is self-contained and once trained does not require re-training), and is suitable for applications that do not require re-generation of sequences (as is the case in the present invention). Further details of the SOM may be found in, for example, Fausett, L. (1994), Fundamentals of Neural Networks: Architectures, Algorithms, and Applications, Englewood Cliffs, N.J.: Prentice Hall, ISBN 0-13-334186-0.

Figure 8A:
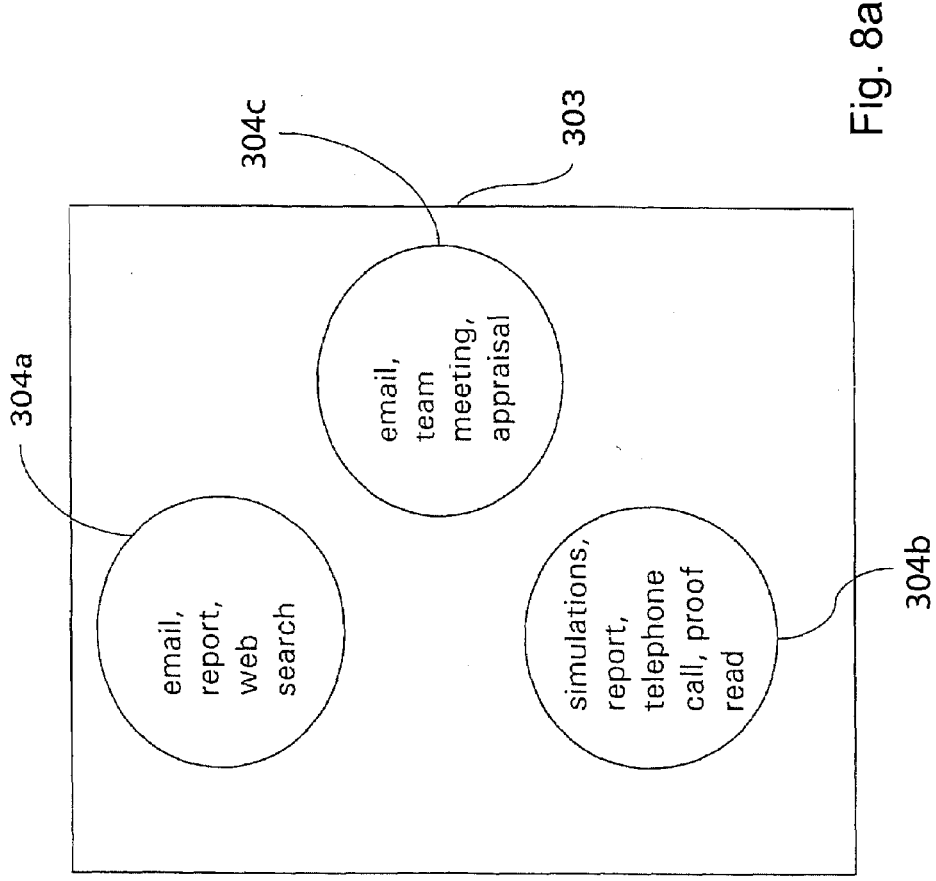
FIG. 8a is a schematic representation of identifying means comprising part of the apparatus of FIG. 3.
Figures 8B, 8C:
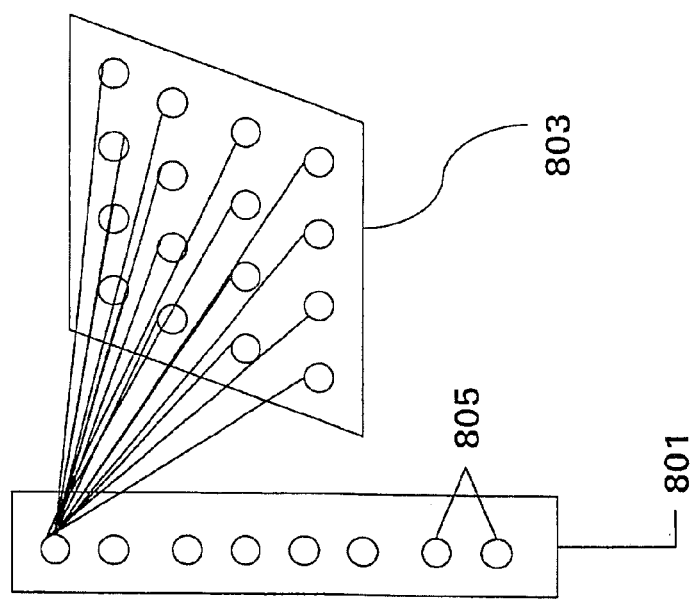

The structure of a SOM includes an input layer 801 and an output layer 803, shown schematically in FIG. 8b, where each layer comprises nodes 805. Each node of the input layer 801 is adapted to receive an input (represented by an input vector), and each input node is typically fully connected to every node on the output layer (shown for one input node only). There is also a weight associated with each connection from the input layer to the output layer. The input layer 801 may comprise any number of input nodes, but in general the number of input nodes should be greater than the dimension order of the output layer grid space (i.e. if output layer 3×3, the dimension order is 3).

Once trained, an SOM is operable to receive an input and to determine which node on the output layer (best) corresponds to this input. Thus an SOM classifies inputs by identifying a "winning" node on the output layer.

A preferred arrangement of the SOM system 304, having three SOM units 304a, 304b, 304c, is illustrated in FIG. 8a, where each SOM unit has been trained on, and stores, permutations of different predetermined tasks. For example, typical tasks that may be stored by the SOM system 304 may include:

SOM$^-_1$ 304a=email, report, web search;
SOM$_2$ 304b=simulations, report, telephone call, proof read;
SOM$_3$ 304c=email, team meeting, appraisal. etc.

Description of links 305a, 305b

The links 305a, 305b provide connections between an output from the SOM system 304 and inputs to the neural network system 301 for generating sequences of elements. Specifically, the links 305a, 305b are connected to a node on the output layer 803 of an SOM unit 304a, 304b, wherein this node, known as the "winning node" is determined as described above. Each of the links 305a, 305b carries a weight between the winning node 309 and each of the task units 306 comprising the neural network system 301. Each of the first ends 307a, 307b of the links 305 connects to the winning node 309 on the said identified SOM unit, and each of the second ends of the links 311a, 311b preferably connects to a node on the STR layer 417 of each of the upper ACTION networks of the task units 306.

Training of the Sequence Generator 201

The training data that is used comprises a plurality of sets of "previous tasks", and "subsequent tasks", the former of which provides input to the SOM system 304 (as described above), and the latter of which provide input to the neural network system 301. These "previous" and "subsequent" elements are most preferably previously observed sequences of user tasks (and sub-tasks, see below) and will be referred to as such.

Learning of "Previous" Elements: SOM System 304

As described above, each SOM unit undergoes a training phase before it can be used to classify inputs. For each of these SOM units 304a, 304b, 304c, this includes formulating input vectors of tasks, or sub-tasks and storing the tasks, then inputting the input vectors to the units. Each input vector comprises a permutation of the tasks, as shown in FIG. 8c for unit 304c. The output layer of the SOM unit 304c learns, in a manner well known to those skilled in the art, how to classify the permutations, and the SOM unit 304c stores the tasks. A single node on the output layer corresponding to a given input permutation may identify the classification, such that each of the nodes on the output layer defines one permutation of the tasks (or sub-tasks, if the sequence generator is used to generate sequences of sub-tasks only).

Figure 9:
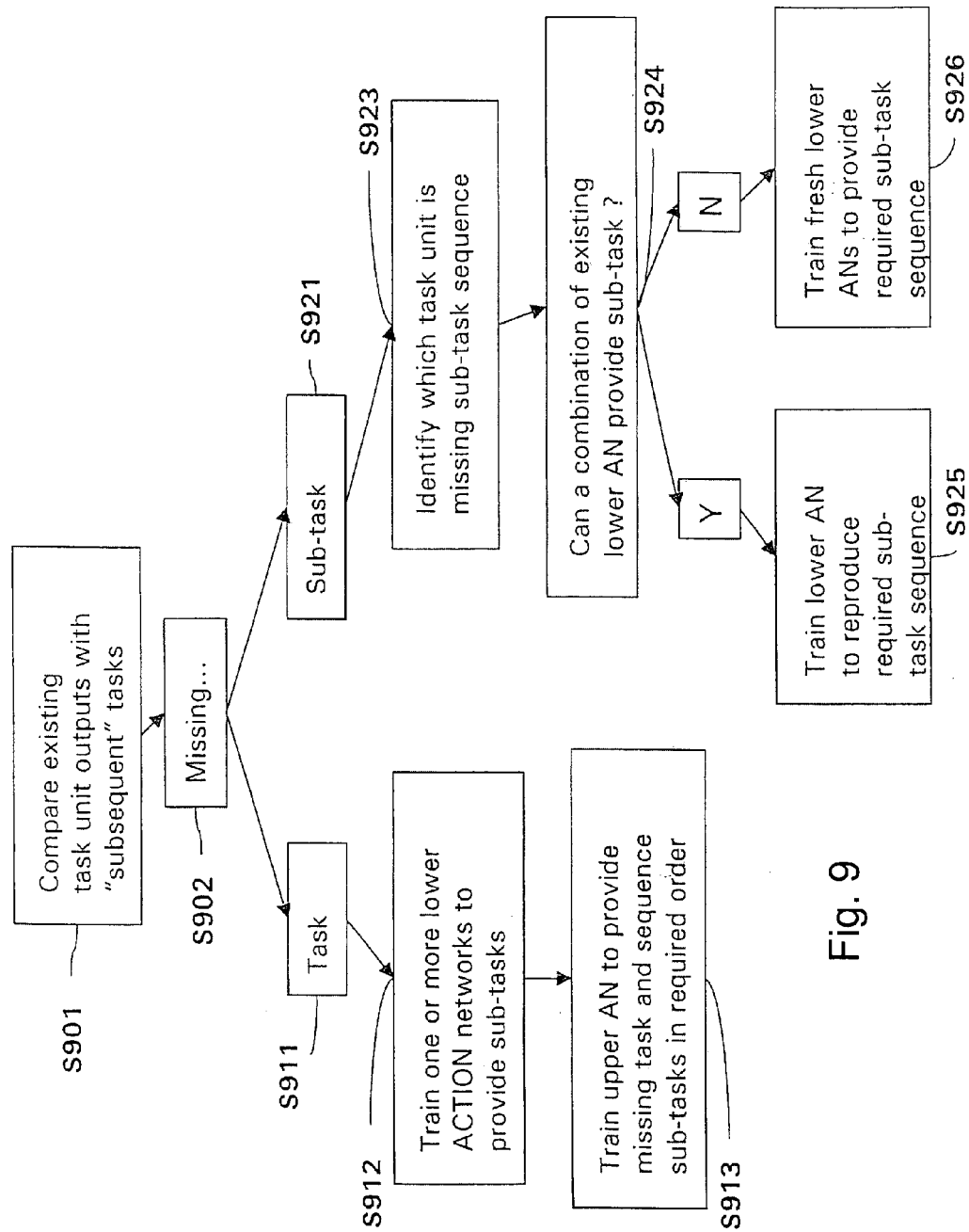
FIG. 9 is a schematic block diagram showing training steps for use in the apparatus of FIG. 3.

Learning of "Subsequent" Elements: Neural Network System 301 for Generating Sequences of Elements As disclosed in Annex 1, and as described briefly above, each task unit 306 is operable to output a task and a series of sub-tasks thereof. It is possible that the task units 306 may already have been trained to generate certain sequences. Thus, before the sequence generator 201 of the present invention is operable to be trained, the sequences that the neural network system 301 has already learnt is assessed, and compared with those comprising the "subsequent" elements. If it is shown that the neural network system 301 needs to learn more sequences in order to reproduce all of the sequences comprising the "subsequent" elements, it is trained accordingly. Typically, this process comprises the following steps (details of training presented in Annex 1) as shown in FIG. 9:

§ S901 Compare the outputs of the task units 306 with the "subsequent" elements;
§ S902 Identify whether the "subsequent" group includes a task that is not provided by any of the task units 306;
☞S911 If the mismatch is a task, then a whole task unit will have to be trained:
 (i) S912 Train one or a plurality of lower ACTION networks to provide the corresponding sub-tasks; and
 (ii) S913 Train an upper ACTION network, having as its first element the missing task, to output a sequence that activates these freshly trained lower ACTION networks in the required order.
☞S921 If the mis-match is in the sub-tasks of a task:
 a) S923 Identify the task unit which has the mismatch of sub-tasks;
 b) S924 Identify whether the missing sub-tasks could be provided by a combination of existing lower ACTION networks;
  (i) S925 If the missing sub-tasks could be provided by a combination of existing lower ACTION networks, train a new upper ACTION network comprising this task unit to trigger this combination;
  (ii) S926 If the missing sub-tasks could not be provided by a combination of existing lower ACTION networks, train a lower ACTION network (or combination of lower ACTION networks) to provide the required sub-tasks.

Once the neural network system 301 and the SOM system 304 have been independently trained to replicate the data comprising the "previous" and "subsequent" sets (the training preferably occurs for multiple such sets), the combined sequence generator is trained. This training occurs by applying reinforcement learning, where the system "tells" the net how well it performs, and which is effected by modifying weights on the links 305a, 305b. Accordingly, upon inspection of the output of the sequence generator 201, which is also the output of the neural network system 301, the weights on the links 305 are modified (if necessary) so that the output converges towards, and ultimately replicates, the sequence of "subsequent" tasks.

The weights preferably take the following form:

$$hipp_{ij}^{\Delta_k}(t) hipp_{ij}^{\Delta_k}(t1) cr \cdot \frac{f(R_m^{E_k}(t))}{N^2 \cdot t_{\max}} \quad (1)$$

where k represents the link (305a, 305b), ij represents a node (309) on an SOM unit, Δ represents an SOM unit (304a), $E_k$ represents the task unit to which the second end of the link is connected (311a, 311b), m represents a connected node within the STR layer of the $E_k$ task unit, t is time, $R_m^{E_k}(t)$ is the activity of node m at time t, N is the dimension of the STR lattice comprising the STR layer (i.e. number of nodes), t is the maximum number of time steps that is required for a task unit to run through its sequence of elements and cr is the reward factor.

The reward factor, cr, takes the value of 1 if the output sequence from the sequence generator 201 replicates the "subsequent" sequence order, and −1 if it does not.

Operation of the Sequence Generator 201

Figure 10:
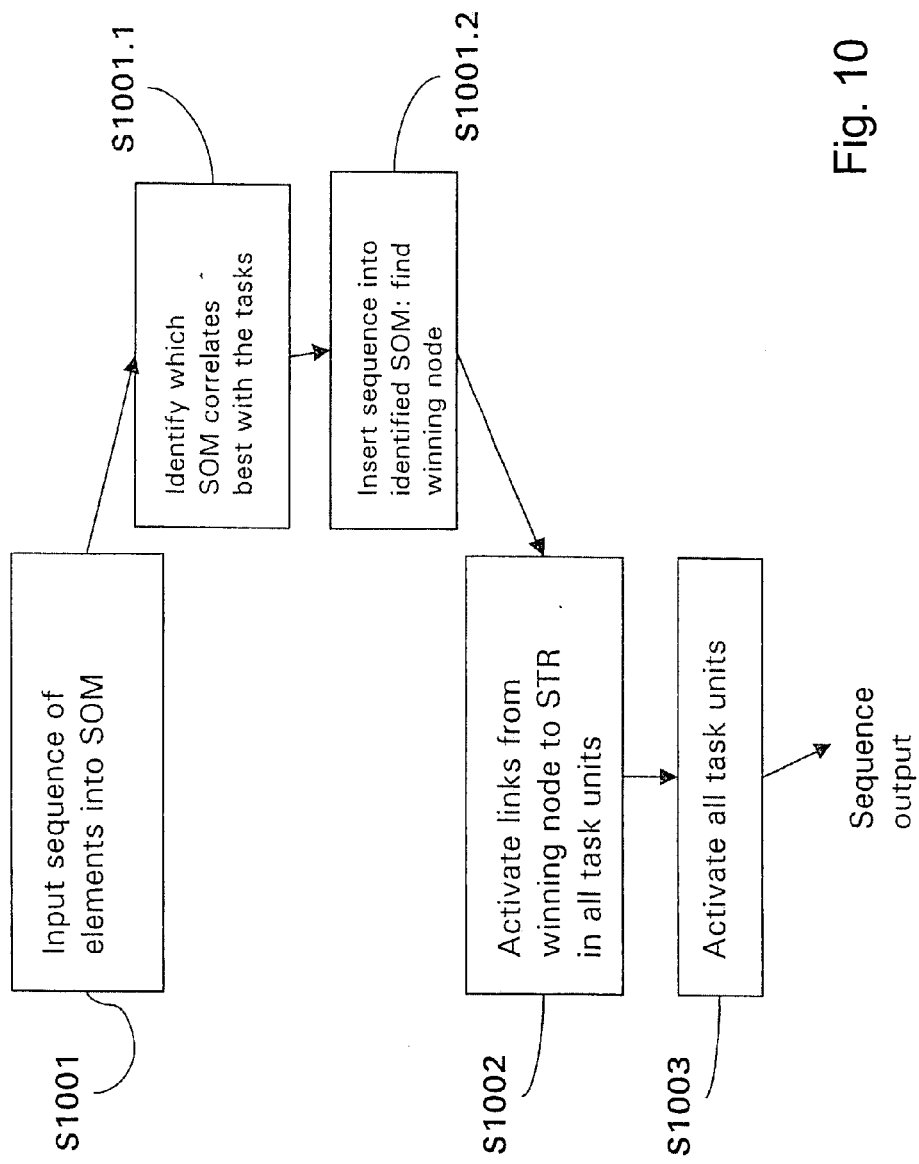
FIG. 10 is a schematic block diagram showing operational steps for the apparatus of FIG. 3.

Referring to FIG. 10, once trained and in operation, the sequence generator 201 undergoes the following steps:

ξ S1001 Input a sequence of elements, or tasks to the Self-Organising Map system 304. This input sequence is unlikely to have been used as training data (categorised as "unseen" data), in which case:

☞ S1001.1 Identify which of the SOM units correlates best with the tasks, by applying simple pattern matching, or similar;

☞ S1001.2 Insert the input sequence as input vector to the identified SOM unit. This identified SOM unit is activated, and a "winning" node 309 (rf) is identified on the output layer, thus classifying the input vector.

ξ S1002 Activate the links 305n from the winning node, 309 rf, to the STR layer 417 of each task unit 306 $E_k$ comprising the neural network system 301, applying the weights, hipp, that have been learnt between that winning node 309 (rf) and said task units 306 $E_k$ during the learning phase.

ξ S1003 Activate all of the task units comprising the (trained) neural network system 301. The system 301 is then run using the weights pre-learnt (and/or those additionally learnt during the learning period). The taskunits thus compete with one another, yielding a hierarchy of tasks that define a task order.

When the "unseen" tasks are tasks that the user has just performed, the output of this embodiment 201 is thus a plan of tasks, which is at least partly a function of a previous set of tasks.

In practical terms, the present invention can be used where at least-one processable event has already occurred, and thus has wide ranging application.

Typical examples include the following:

Software Agent-Interaction

At present, agent interaction may be defined by plans, stored in a pre-defined plan library. However, the present invention may be used to dynamically schedule agent tasks, receiving as input the most recently completed actions, and providing as output the most suitable events to be processed next.

System Control

When the operation of a system involves sequential movements of control devices, such as valves in a drainage system, the selection of movements may partly depend on any previous actions. For example, in a drainage system, where there is a plurality of electronically operated valves, a task such as "drain pipe in Section n" may correspond to the general task "drain", but this general task may take several forms, each comprising alternative sub-tasks corresponding to the Section to be drained. Selection of the appropriate form may be learnt in the manner described above, such that in operation, the sequence generator 201 will select a drain function to suit the preceding valve conditions (e.g. position of valve).

User Task Scheduling

Typically a human has a set of tasks that require completing over a given time scale. In order to perform these tasks most efficiently, it may be pertinent to take into account tasks that have most recently been completed, as this may stimulate a different choice of subsequent tasks compared with if the human had started working afresh.

Modifications and Additional Details:

As is known in the art, a critical issue in developing a neural network is generalisation: how well will the network make predictions for cases that are not in the training set? Neural Networks, like other flexible non-linear methods such as kernel regression and smoothing splines, can suffer from either under-fitting or over-fitting. The number and selection of training data that is used to train the neural network is crucial to its subsequent performance: put simply, the training data is used to provide an empirical solution (the system "learns" this empirical solution), from which a solution to any data can be extrapolated. Thus the selection of input data that is used for training should result in a representative solution, avoiding the problems of over-fitting, under-fitting, and reducing noise. As described above, the identifying means 303 may be provided by means other than a plurality of SOM units, and if provided by another neural network arrangement, these alternative means require similar attention to training data.

In general, a SOM unit tries to find clusters such that any two clusters that are close to each other in the output layer 803 have vectors close to each other in the input space, but this requires a priori knowledge of relationships between inputs (nodes) comprising the input layer. In the present invention it may be the case that all of the inputs are independent of one another, or that insufficient information about their relationships is available; in this situation, an alternative, although more restrictive, form of the identifying means 303 could be provided by dedicated nodes that store previously completed task information. With such an arrangement, the sequences generated for inputs will be less useful than when a SOM system is used because the identifying means can only provide guaranteed solutions that correspond to the dedicated nodes (i.e. for input data that the identifying means has explicitly been trained on).

The neural network system 301 may be replaced by a recurrent network, such as Elman[ix] or Hopfield[x] networks, both of which are artificial neural networks, and the biological neural network described in Zipser, "Recurrent Network Model of the Neural Mechanism of Short-Term Active Memory", Neural Computation 3, 179–193, 1991. These alternative recurrent networks would require some modification from their standard form in order to receive input from adaptive weighted links 305a, 305b.

Many modifications and variations fall within the scope of the invention, which is intended to cover all configurations of the generator described herein.

As will be understood by those skilled in the art, the invention described above may be embodied in one or more computer programs. These programs can be contained on various transmission and/or storage mediums such as a floppy disc, CD-ROM, or magnetic tape so that the programs can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. Neural Network apparatus comprising:
   (i) identifying means for
      a) receiving a first one or more sequence of elements,
      b) accessing stored sequences, and
      c) identifying which of the stored sequences each of the first one or more received sequences of elements most closely resembles,
   which identifying means is operable to output, for each received sequence of elements, an identifying signal indicative of the
   correspondingly so identified stored sequence; and characterised in that the apparatus further comprises
   (ii) a sequence generator for generating sequences of elements, operable to receive as input a said identifying signal and to generate a sequence of elements in response thereto;
   the apparatus being arranged such that when a first sequence of elements is input to the identifying means (i), the identifying means identifies a stored sequence that the first sequence of elements most closely represents and outputs to the sequence generator an identifying signal indicative of the same, and the sequence generator (ii) generates and outputs a second one or more sequences.

2. Apparatus according to claim 1, wherein the identifying means (i) comprises a plurality of classifying units, each of which classifying units comprises:
   a) a plurality of first classifying nodes;
   b) a plurality of second classifying nodes;
   c) a plurality of classifying links, each classifying link connecting one of the first classifying nodes with one second classifying node and having a classifying weight associated therewith; each classifying unit being operable to learn one or more sequences of elements by modifying the classifying weights on the classifying links.

3. Apparatus according to claim 1, wherein the sequence generator for generating sequences of elements (ii) includes one or more task units, each task unit comprising an upper and a lower neural network connected in a hierarchical relationship and being connected to each of the other task units by means of sequence generator weighted connections therebetween.

4. Apparatus according to claim 3, wherein the upper and lower neural networks comprising the sequence generator each comprise at least a first intra-neural network layer and a second intra-neural network layer, which second intra-neural network layer has feedback to the first intra-neural network layer via a further layer, and each of which neural networks is operable to output a signal indicative of a sequence of elements.

5. Apparatus according to claim 4, wherein the said intra-neural network layers are interconnected by intra-neural network links and at least some of the intra-neural network links are variably weighted, thereby providing a means to modify the sequence output by the task unit.

6. Apparatus according to either one of claim 4, wherein the sequence of elements are stored as an element array in each neural network, which array defines the order in which the elements are output.

7. Apparatus according to claim 6, wherein each sequence generator weighted connection interconnecting one task unit with another task unit comprises an inter-neural network link having two ends, a first end connecting with a second intra-neural network layer of a first task unit upper neural network, and a second end connecting with a second intra-neural network layer of a second task unit upper neural network.

8. Apparatus according to claim 2, further including connecting means for connecting the identifying signal indicative of the identified stored sequence with the sequence generator (ii), the connecting means comprising
   a plurality of connecting links, each connecting link having two ends and a variable connecting weight thereon,
   wherein, for each connecting link, a first end connects with the identified one of the second classifying nodes and a second end connects with one task unit comprising the sequence generator (ii),
   the arrangement being such that each task unit connects with one second end only.

9. Apparatus according to claim 8, wherein each second end connects with the second intra-neural network layer of an upper neural network comprising a task unit.

10. Apparatus for generating a sequence of elements, including at least one task unit, each of which at least one task units has an upper and a lower neural network connected in a hierarchical relationship, the upper neural network and the lower neural network each comprising at least a first layer and a second layer, which second layer having feedback to the first layer via a further layer, hind each neural network being operable to output a signal indicative of a sequence of elements, wherein the second layer of the upper neural network is adapted to receive a signal from a system for modifying the sequence of elements wherein the system for modifying the sequence of elements comprises identifying means, which identifying means is operable to receive as input a signal indicative of one or more sequences of elements, and is adapted to: a) access stored sequences of elements, and b) identify which of the stored sequences of elements each of the one or more received sequences of elements most closely resembles, the identifying means being adapted to output, for each of the one or more received sequences of elements, a signal indicative of the correspondingly so identified stored sequences.

11. A method of training an apparatus to generate a predetermined second one or more sequences of elements after receiving a predetermined first one or more sequences of elements, the method comprising the steps:
   (i) inputting a plurality of first training sequences to identifying means for learning and classification thereby;
   (ii) inputting a plurality of second training sequences to a sequence generator for generating sequences of elements, for storage therein;

(iii) for each of the second training sequences, training the sequence generator for generating sequences of elements to re-generate the sequence in accordance with a predetermined order;
(iv) interconnecting the identifying means with the sequence generator of steps (ii) and (iii) by connecting means, which connecting means comprises one or more variably weighted links;
(v) for each of the plurality of predetermined first sequences, operating the identifying means in association with the sequence generator for generating sequences by means of the connecting means, such that the sequence generator reproduces the predetermined second sequence associated with the respective first sequence.

12. A method according to claim 11, wherein the learning step (i) comprises performing the classification of the first training sequences, learning a plurality of predetermined rules that correspond to said classification and storing the first training sequences.

13. A method according to claim 11, wherein the operating step (v) comprises the following steps:
a) inputting the first sequence to the identifying means;
b) receiving an output signal from the identifying means;
c) interconnecting the output signal with the sequence generator for generating sequences of elements by the weighted links providing the connecting means;
d) receiving a generated sequence of elements from the sequence generators;
e) comparing the generated sequence with one of the second sequences;
f) if the generated sequence does not reproduce the one of the second sequences, modifying the weight on the one or more links;
g) repeating steps (b)–(f) until the generated sequence reproduces said one of the second sequences.

14. A method of generating a second one or more sequences of elements after processing a first one or more sequences of elements, the method comprising the steps:
(i) inputting a first sequence of elements to identifying means;
(ii) accessing stored sequences;
(iii) identifying which of the stored sequences each of the first one or more sequences of elements most closely resembles;
(iv) operating the identifying means so as to generate an output signal indicative of the correspondingly so identified stored sequences;
(v) connecting said output signal to a sequence generator for generating sequences of elements; and
(vi) operating the sequence generator for generating sequences of elements; such that when a first sequence of elements is input to the identifying means (i), the identifying means identifies which of the stored sequences the first sequence of elements most closely represents and outputs a signal indicative of the same, the output signal is connected to the sequence generator (ii) for generating sequences of elements, and the sequence generator (ii) outputs a signal indicative of a second one or more sequences.

* * * * *